(12) United States Patent  
Arntjen (10) Patent No.: US 6,273,813 B1
(45) Date of Patent: Aug. 14, 2001

(54) VENTILATION APPARATUS (76) Inventor: Gerd Arntjen, An der Brücke 33-35, 26180 Rastede (DE)

(*) Notice: Subject to any disclaimer, the term of this patent is extended or adjusted under 35 U.S.C. 154(b) by 0 days.

(21) Appl. No.: 09/311,494

(22) Filed: May 13, 1999

(30) Foreign Application Priority Data

May 28, 1998 (DE) .......................................... 298 09 644 U
Sep. 7, 1998 (DE) .......................................... 298 15 953 U (51) Int. Cl.$^7$ ....................................................... F24F 7/00
(52) U.S. Cl. ........................................... 454/254; 119/448
(58) Field of Search ..................................... 454/239, 256, 454/254, 333; 119/437, 448; 160/331, 265

(56) References Cited

U.S. PATENT DOCUMENTS 3,669,350 * 6/1972 White .
5,813,599 * 9/1998 Hoff ................................. 454/239 X

* cited by examiner

Primary Examiner—Harold Joyce
(74) Attorney, Agent, or Firm—Gottlieb, Rackman & Reisman, P.C.

(57) ABSTRACT

A ventilation apparatus for arranging in a wall-surface region of a building.

Such ventilation apparatuses are customary for so-called unheated sheds (stables, cowsheds, pigsties, etc.). In this case, an outer side of a shed building is closed against the entry of wind only with one or more tarpaulin-like wall elements, which are arranged one above the other and can be opened for more extensive ventilation of the shed by virtue of the fact that the wall element is wound toward the top like a roller blind.

The object of the invention is therefore to provide a ventilation apparatus in which the wall element is opened by defined or controlled lowering of the top margin of the wall element while simultaneously winding the wall element and only by means of a single drive.

This object is achieved according to the invention in that the wall element and the tension element together with further elements form a bow, ultimately more or less closed via the single common drive member, in which case the tension member itself is preferably unwound on the winding shaft to the same extent as the wall element is wound, or vice versa, specifically in opposite directions to one another.

18 Claims, 7 Drawing Sheets

VENTILATION APPARATUS

The invention relates to a ventilation apparatus for arranging in a wall-surface region of a building.

Such ventilation apparatuses are customary for so-called unheated sheds (stables, cowsheds, pigsties, etc.). In this case, an outer side of a shed building is closed against the entry of wind only with one or more tarpaulin-like wall elements, which are arranged one above the other and can be opened more or less wide for more extensive ventilation of the shed by virtue of the fact that the bottom margin of one wall element is lifted, the top margin is lowered or the wall element is wound toward the top like a roller blind.

These opening actions may be effected, for example, by electric drives in a thermostatically controlled manner.

The wall elements used are films which are relatively thin but are impermeable to wind and are very tear-resistant but are relatively sensitive with regard to abrasion stress. For this reason, it is not very advisable to simply gather such a wall element by the top margin being lowered or by the bottom margin being raised and by the wall element being folded up in an undefined manner in the process. Winding the wall element is therefore the more desirable action.

However, winding the wall element toward the top like a roller blind has the disadvantage that, when the wall element is opened slightly, the air draft arises first of all in that region of the shed which is closer to the floor, so that there is a risk that the animals housed in the shed will catch a chill.

The object of the invention is therefore to provide a ventilation apparatus of the generic type mentioned at the beginning in which the wall element is opened by defined or controlled lowering of the top margin of the wall element while simultaneously winding the wall element and only by means of a single drive.

This object is achieved according to the invention by the defining features of claim 1.

Advantageous developments follow from the subclaims.

In the ventilation apparatus according to the invention, the wall element and the tension element alone or together with further elements form a bow or loop, ultimately more or less closed via the single common drive member, in which case the tension member itself is preferably unwound on the winding shaft to the same extent as the wall element is wound, or vice versa, specifically in opposite directions to one another. This has the advantage that, in absolute synchronism, the tension member gives way to the wall element precisely to the extent which is necessary, so that, during the winding action with the opening direction toward the bottom, the top margin of the wall element is held or eased in a defined manner by means of a single drive.

The type of drive, as in the prior art, may be effected manually, e.g. by means of cranks and universal shafts, or electrically or in another suitable manner, and also in particular in a thermostatically controlled manner.

The coordination of the tension member and the wall element, with regard to the uniform space requirement and thus a proper winding action without the drive being subjected to greater loading, is ensured in an especially effective manner if, as provided in a preferred development of the invention, the tension member, as a sheet, is made of the same tarpaulin material as the wall element itself. Irrespective of this, however, it is also conceivable, in order to cushion any loading forces, to arrange the drive member in a flexible manner, e.g. with spring suspension, or to accommodate appropriately flexible sections or elements in the loop of tension member and wall element.

The tension member may be attached directly to the wall element or may act on a horizontal bar, which is movable up and down and from which the wall element hangs down, in which case the term "bar" is to be understood here in the widest sense and may denote, for example, any strengthening or stiffening of the top margin of the wall element.

Direct fastening of the tension member to the wall element is possible and is of advantage in particular if, as provided in a development of the invention, the tension member extends with its own width essentially over the entire width of the wall element. This is possible if the tension member is of net-like design, so that the passage of air through the tension member, even if choked, depending on mesh width, is possible, so that the wall element opens through the tension member. Certain choking of the air, depending on the prevailing wind conditions, is often entirely desirable, in which case the degree of choking can be preset by the proportion of holes in the tension member. Tension members having different proportions of holes could be interchangeable, or the tension member could even have strips which run horizontally one above the other and have different proportions of holes, so that the degree of opening of the wall element and the degree of choking of the tension member are correlated with one another in an advantageous manner.

In a development of the invention, the tension member may be divided into two strands, which are connected to one another via a common winding core, on which they can be wound and unwound in opposite directions or in contra-rotation. Such a winding core may also be designed as a type of horizontal bar. If the tension member should extend over the width of the wall element in such a design of the apparatus according to the invention, it ought to be severed, for example in the region of rotary bearings of the winding core, which if need be are arranged equidistantly, and thus be divided into vertical strips.

The tension member is preferably arranged so as to be laterally offset from the wall element in order not to allow the winding actions of the wall element and the tension member to mutually hinder one another. Such a lateral offset is equally possible by means of deflection pulleys and via a winding core.

The next development of the invention, for which independent protection is also claimed, is distinguished by the fact that the top margin of the wall element can be fixed directly or indirectly in a top position, and the winding shaft can be lifted by its own winding work while winding the wall element and preferably while carrying the appropriately guided drive member with it. As a result, the wall element (by way of exception) can be wound completely to the top and is to be opened in order to bring it into a rest position in which it is better protected, for example, from the effects of the weather and from being grabbed by animals—animals in the shed or, for example, rodents—and in fact again with the game single drive.

A further development of the invention, for which independent protection is likewise claimed, provides for the winding shaft, the winding core, the horizontal bar and/or a bar-like or tubular element of similar function to be designed as a rail, which has slot guides, arranged approximately diametrically opposite one another, for the positive-locking insertion of a widened marginal region (of a so-called weatherstrip) of the tarpaulin-like wall element and the tension member respectively.

Such a "double weatherstrip rail", which constitutes a separate further development of the apparatus according to the invention, is especially advantageous and easy to assemble for the simultaneous winding of tarpaulin elements but also simply for their reliable connection. To form a weatherstrip, the tarpaulin element, for example, may be turned up in the marginal region to form a tube shape open only at the end faces and may be connected to itself. A bar, for example, can then be pushed into the tube shape in order to widen it. The tube shape with the bar located therein can then be pushed from the end face into the slot guide of essentially C-shaped profile, the tarpaulin element projecting through the slot, which is open over the length of the slot guide.

Figures 1, 2:
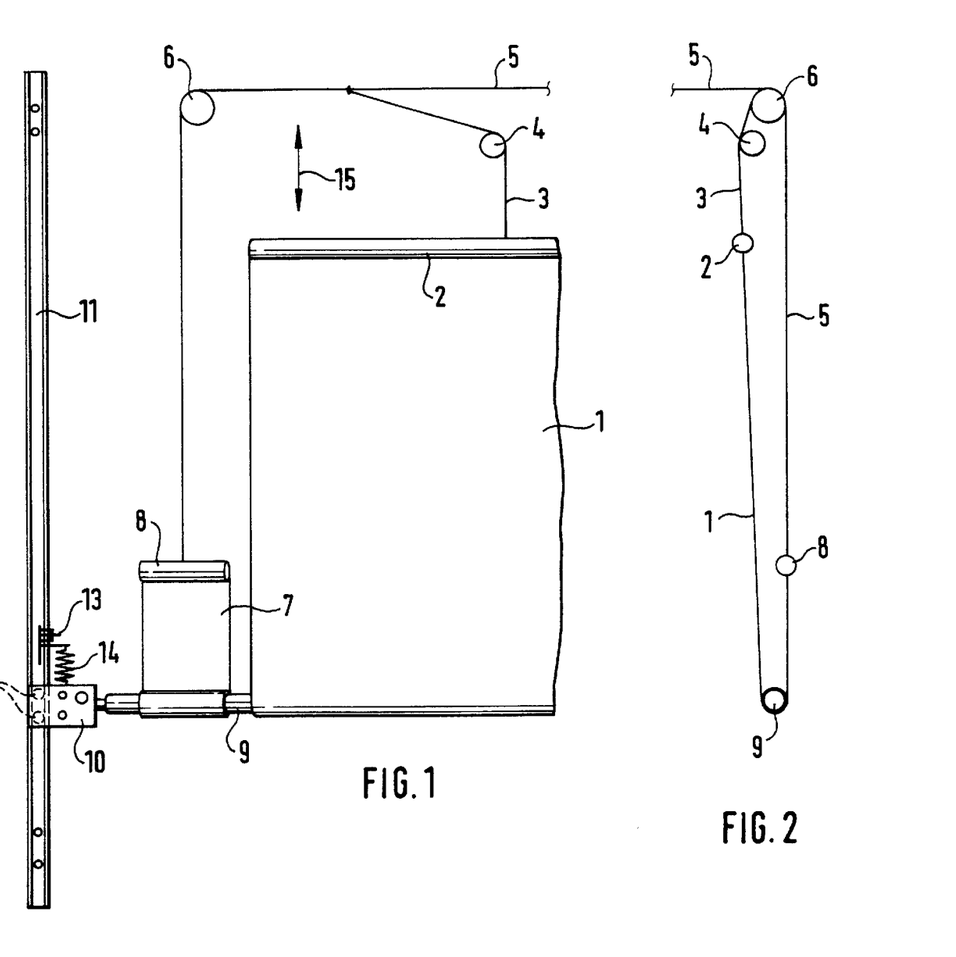
FIG. 1 shows a first exemplary embodiment of a ventilation apparatus according to the invention in a front view.
FIG. 2 shows the exemplary embodiment according to FIG. 1 in a side or end view.

Exemplary embodiments, from which further inventive features can also be gathered, are schematically shown in the drawing, in which:

FIG. 1 shows a first exemplary embodiment of a ventilation apparatus according to the invention in the front view, the basic activity of a tarpaulin-like wall element 1 for opening and closing the shed wall opening (not shown in any more detail) located behind it being shown in this exemplary embodiment.

The tarpaulin-like wall element 1 is fastened over its entire width to a horizontal bar 2, which is designed as a double weatherstrip rail. Acting on the top of this horizontal bar 2 is a fall rope 3, which is run over a deflection pulley 4 and connected to a main rope 5, which in turn is deflected via a deflection pulley 6. At its end remote from the horizontal bar 2, the main rope 5 is connected to a tension tarpaulin 7, to be precise preferably via a section of a second double weatherstrip rail 8. At its bottom end, just like the main tarpaulin functioning as the wall element 1, the tension tarpaulin 7 is pushed into a weatherstrip rail of a bottom double weatherstrip rail 9. This bottom double weatherstrip rail is a winding shaft 9, which can be driven by a rotary drive 10, which can be actuated, for example, by an electric drive unit or by a mechanical crank handle. This rotary drive 10 is guided in a so-called helm rail 11 in such a way that it can be moved up and down, the helm rail 11 having an essentially C-shaped cross section, in which running rollers 12 of the rotary drive 10 can run. With a locking device 13, the rotary drive can be locked on the helm rail 11 in the position shown in FIG. 1 or can also be unlocked for its up and down motion. Opposite its own locking device 13, the rotary drive is also cushioned with a spring element 14. The weight of the rotary drive and the weight of the tarpaulin-like wall element may be counterbalanced with counterweights, e.g. at the main rope 5, in order to facilitate lifting and lowering operations.

The ventilation apparatus shown in FIG. 1 functions in the following way:

In order to close the opening located behind the tarpaulin-like wall element 1 in a shed wall (not shown in any more detail), the tarpaulin-like wall element is unwound from the winding shaft 9. This means that the top horizontal bar 2, and thus the top margin of the tarpaulin-like wall element, is moved up into the highest position. The mobility is indicated by the double arrow 15. The tarpaulin-like wall element 1 and the tension tarpaulin 7 are inserted into the double weatherstrip rail of the winding shaft 9 in opposite directions, so that they are wound or unwound in opposite directions or in contra-rotation during a rotation of this winding shaft 9. This means that the tension tarpaulin 7 is in the completely wound state on the winding shaft 9 when the tarpaulin-like wall element 1 is completely unwound. The tension tarpaulin 7 and the tarpaulin-like wall element 1 are preferably made of the same film material, so that any stresses or spring forces exerted on the winding shaft 9 by this material are mutually counteracted. If residual forces should nonetheless ultimately act on the rotary drive 10, these residual forces would be absorbed and cushioned by the spring element 14 in order to avoid tearing of the tarpaulins or tension members 1, 3, 5, 7 involved.

If the opening located behind the tarpaulin-like wall element 1 is to be at least partly opened, this is done by winding the tarpaulin-like wall element 1 around the winding shaft 9. To this end, the rotary drive 10 is actuated in the appropriate direction of rotation. So that such winding is possible without tearing the tarpaulin-like wall element 1, the top margin of the tarpaulin-like wall element 1 in the form of the top horizontal bar 2 must be correspondingly eased in synchronism at the same speed at which the rotary drive 10 winds the tarpaulin-like wall element on the winding shaft 9. This is done via the fall rope 3 and the main rope 5, which are ultimately connected to the tension tarpaulin 7. The latter is unwound to the same extent from the same winding shaft 9 by the same rotary motion of the rotary drive 10 with which the tarpaulin-like wall element 1 is wound. These actions take place automatically in full synchronism, and specifically in an especially outstanding manner, if the tension tarpaulin 7 and the tarpaulin-like wall element 1 are formed from the same film material.

During this opening action, the tarpaulin-like wall element is therefore wound toward the bottom, so that an increasingly larger top air gap for the ventilation is opened above the horizontal bar 2 by the tarpaulin-like wall element 1. This avoids an unpleasant air draft in the shed region close to the floor.

Closing of the opening takes place in the reverse sequence by virtue of the fact that the direction of rotation of the rotary drive 10 is reversed, the tarpaulin-like wall element 1 is thus unwound, and at the same time the top margin of the tarpaulin-like wall element is raised to the same extent via the top horizontal bar 2 and the fall rope 3 as well as the main rope 5 and the tension tarpaulin 7, which is wound at the same time.

If the wall element 1, by way of exception, is ever to be wound toward the top for complete opening for is a longer-lasting period, the rotary drive 10 may be unlocked by the locking device 13 at the helm rail 11. By the rotary action and the winding of the wall element 1 from below, the rotary drive 10 is thus able to climb up on the helm rail 11 and thus raise itself. Of course, for this purpose, the fall rope 3, the main rope 5 or the top horizontal bar 2 must also previously be locked in the top position of the top margin of the wall element 1. This is easily possible with simple means. When the winding-up operation is complete, the rotary drive 10 would thus be located in the region of the top end of the helm rail 11, together with the winding shaft 9, on which the wall element 1 is wound, so that the winding shaft 9 is then located directly below the top horizontal bar 2 in the top position. At the same time, of course, the tension tarpaulin 7 would in turn be unwound and hang down loosely in a sagging manner. However, this disturbs neither the opening action nor the degree of opening of the corresponding shed wall, nor the subsequent closing action.

A side view of the ventilation apparatus according to FIG. 1 can be seen in FIG. 2. The view is toward the edges of the wall element 1 and the tension tarpaulin 7. The same components are designated with the same reference numerals as in FIG. 1, as is also the case in the other figures below.

It can be seen in particular in FIG. 2 that the top horizontal bar 2, the bar section 8 and the winding shaft 9 are each designed as double weatherstrip rails; that is, on the top side and the underside, they each have rail shapes, into which weatherstrips of the elements 1, 7 involved can be pushed in each case. In this way, simple and reliable connection of such elements is possible, as well as a winding action about the winding shaft 9. In addition, in the region of the winding shaft 9, the contra-rotating orientation of the wall element 1 and the tension tarpaulin 1 are indicated. These two elements 1, 7 do not hinder one another during the winding action, since they are arranged so as to be offset on the winding shaft 9, that is one behind the other in the view of FIG. 2.

Rope elements, such as, for example, the fall rope 3, may be fastened in a weatherstrip rail by a rope-widening head being attached to the rope end, and this rope-widening head can be pushed in a positive-locking manner into the corresponding weatherstrip rail from the end face.

Figure 3:
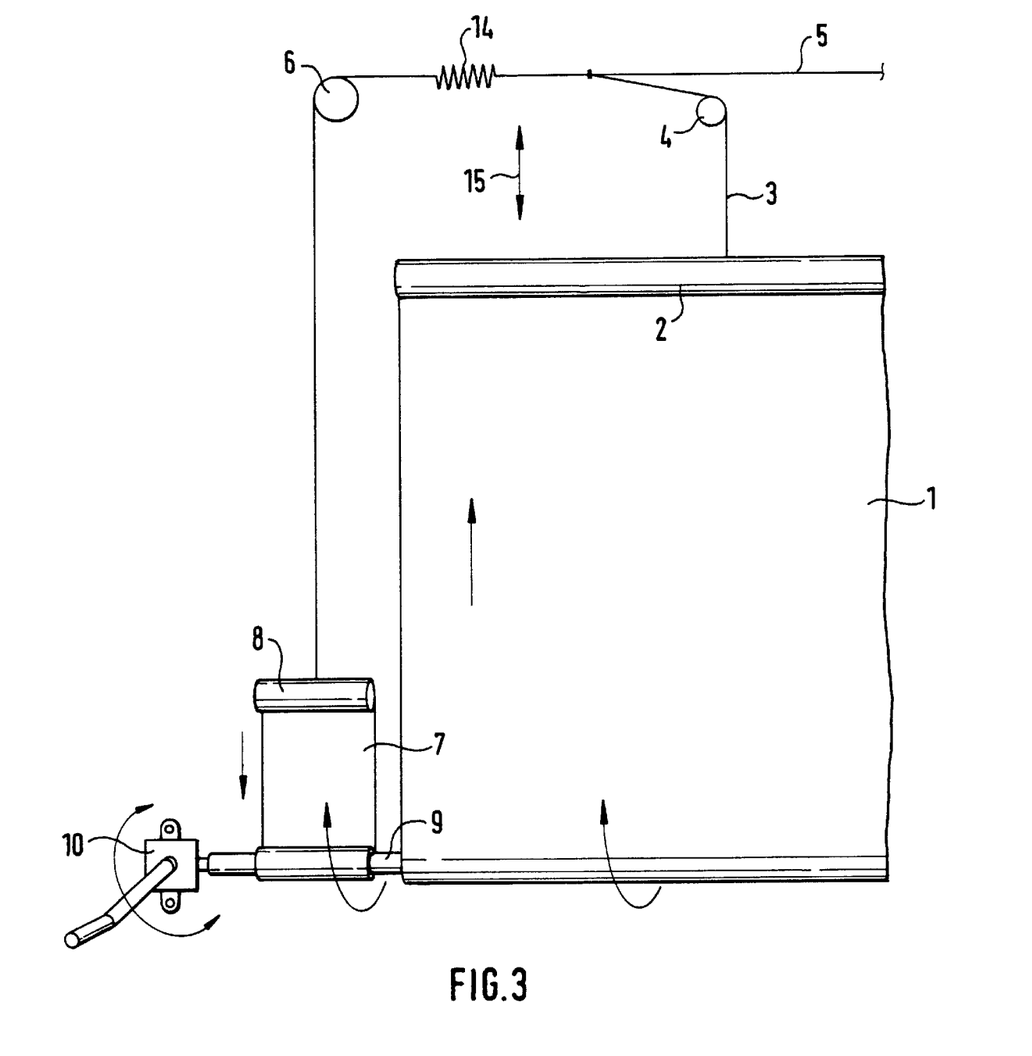
FIG. 3 shows a second exemplary embodiment of a ventilation apparatus according to the invention in the front view.

FIG. 3 shows a second exemplary embodiment of a ventilation apparatus according to the invention in accordance with FIG. 1. The only differences from FIG. 1 consist in the fact that an elastic cushioning element 14, which is no longer present in the region of the firmly mounted rotary drive, is arranged in the connecting region between fall rope 3 and main rope 5. Also, the rotary drive, unlike the rotary drive in FIG. 1, is not movable in the perpendicular direction on a helm rail 11.

The side view with respect to FIG. 3 would in principle look exactly like the side view according to FIG. 2. In this connection, it should be mentioned at this point that the main rope 5, as indicated in FIG. 2, may also be extended from the ventilation apparatus in order to actuate, for example, juxtaposed similar ventilation apparatuses coupled simultaneously to a single drive.

Figure 4:
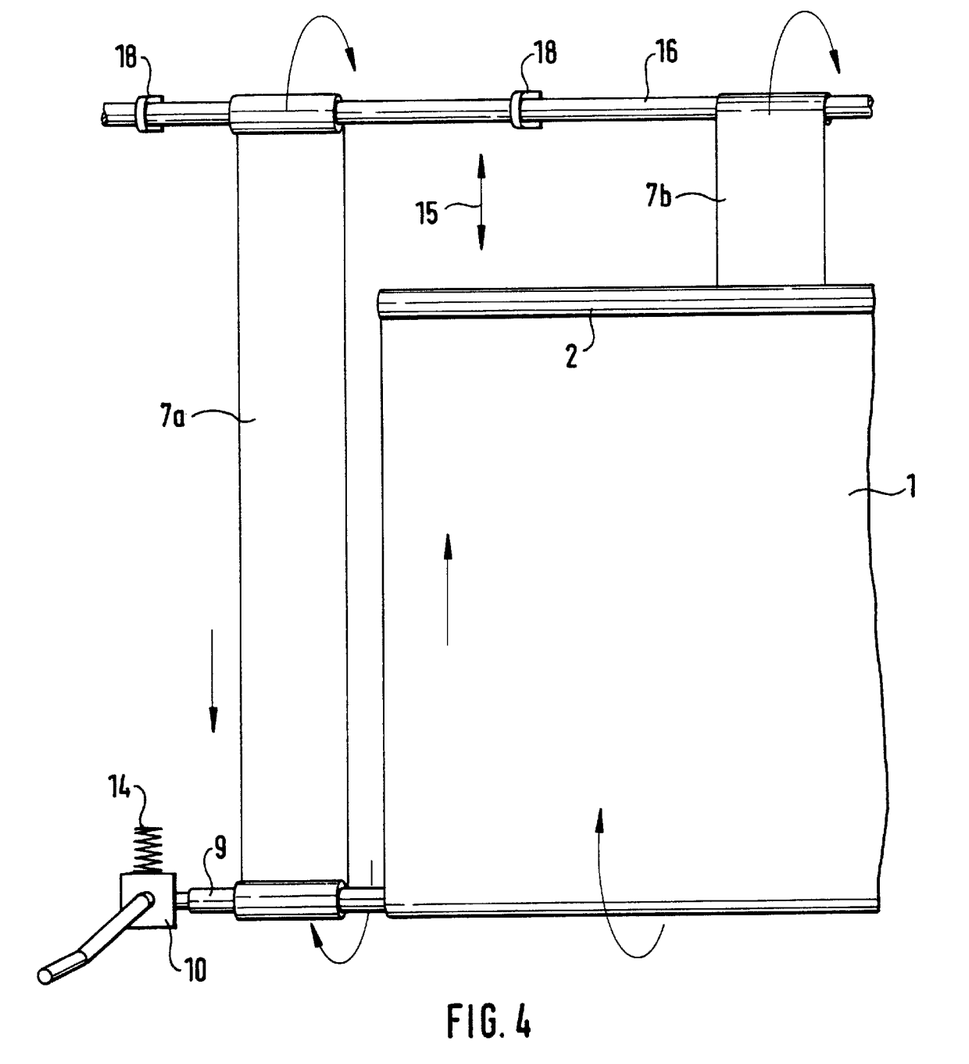
FIG. 4 shows a third exemplary embodiment of a ventilation apparatus according to the invention in the front view.

FIG. 4 shows a third exemplary embodiment of a ventilation apparatus according to the invention.

This exemplary embodiment is emphatically different from the preceding exemplary embodiments. This is because the fall rope 3 is replaced by a second tension-tarpaulin section 7b, while the first tension-tarpaulin section 7a also replaces the main rope 5. Both tension-tarpaulin strands 7a and 7b are connected to one another via a winding core 16 instead of via a rope. The winding shaft 9 and the winding core 16 are in drive connection with one another via the tarpaulin-like wall element 1 and the second strand 7b of the tension tarpaulin on the one hand as well as via the first strand of the tension tarpaulin 7a, so that, by means of the rotary drive 10, not only is the winding shaft 9 driven but the top winding core 16 also runs along with it in the same direction, so that, in the region of the winding core 16, the strands 7a and 7b of the tension tarpaulin are wound and unwound respectively and in this way provide the requisite winding clearance for the tarpaulin-like wall element 1. As an alternative, the rotary drive 10 could also be connected directly to the top winding core 16, so that the winding shaft 9 runs along with it.

The side view of the exemplary embodiment according to FIG. 4 would in principle still look like the side views of FIGS. 1 and 3, although, instead of the top deflection pulley 6, the winding core 16, in an end view, would have to be shown as a double weatherstrip rail at a corresponding location.

Figure 5:
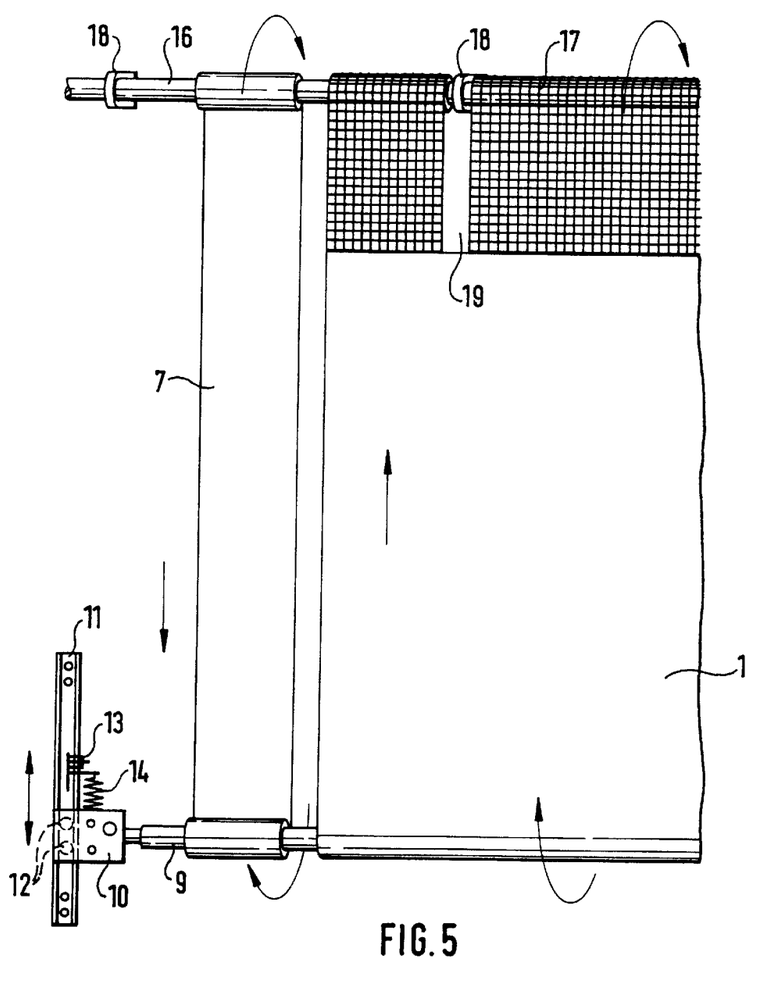
FIG. 5 shows a fourth exemplary embodiment of a ventilation apparatus according to the invention in the front view.

FIG. 5 shows a further exemplary embodiment of the ventilation apparatus according to the invention. This exemplary embodiment differs in turn from the exemplary embodiment according to FIG. 4. This is because the second strand 7b of the tension tarpaulin is now replaced by a net tarpaulin 17, which is divided along a slot 19 in the region of U-shaped bearings, open at the top, or of sleeve bearings 18 for the rotatable winding core 16.

The net tarpaulin 17 extends over the entire width of the tarpaulin-like wall element 1 and yet permits an opening above the wall element 1, since it is precisely of net-like design or has other ventilation apertures. Provision may be made for horizontal strips of the net tarpaulin 17 which have different mesh widths or proportions of holes, so that, depending on the degree of opening provided by the wall element 1, appropriate sections of the net tarpaulin 17 are put into operation and a more of less choked ventilation passage is ensured.

Figure 6:
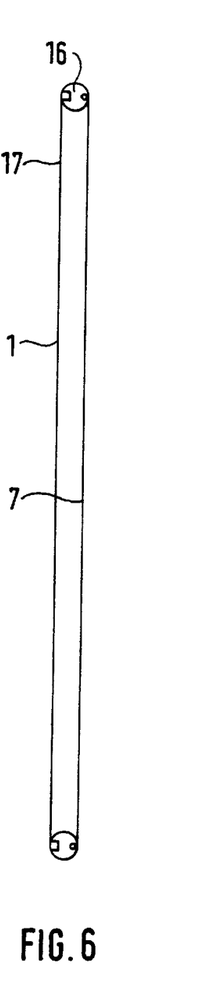
FIG. 6 shows the exemplary embodiment according to FIG. 5 in a side view.

FIG. 6 shows the side view of the exemplary embodiment according to FIG. 5, which looks extremely simple. The tarpaulin-like wall element 1, together with the net tarpaulin 17 on the one hand and the tension tarpaulin 7 on the other hand, apparently forms a closed loop in the side view, which acts with its respective strand on the winding shaft and the winding core 16.

In FIG. 5, the rotary drive 10 is again indicated on a helm rail 11 with locking device 13 and spring element 14.

As an alternative, in this exemplary embodiment as well as in the other exemplary embodiments, the rotary drive 10 could in principle be arranged at the top, i.e. in the present exemplary embodiment on the winding core 16, which then functions as the winding shaft. The same sequence of motion is then obtained. Even "climbing", that is winding of the wall element 1 toward the top, is possible if the winding shaft 9, now winding core, were to be unlocked.

Figure 7:
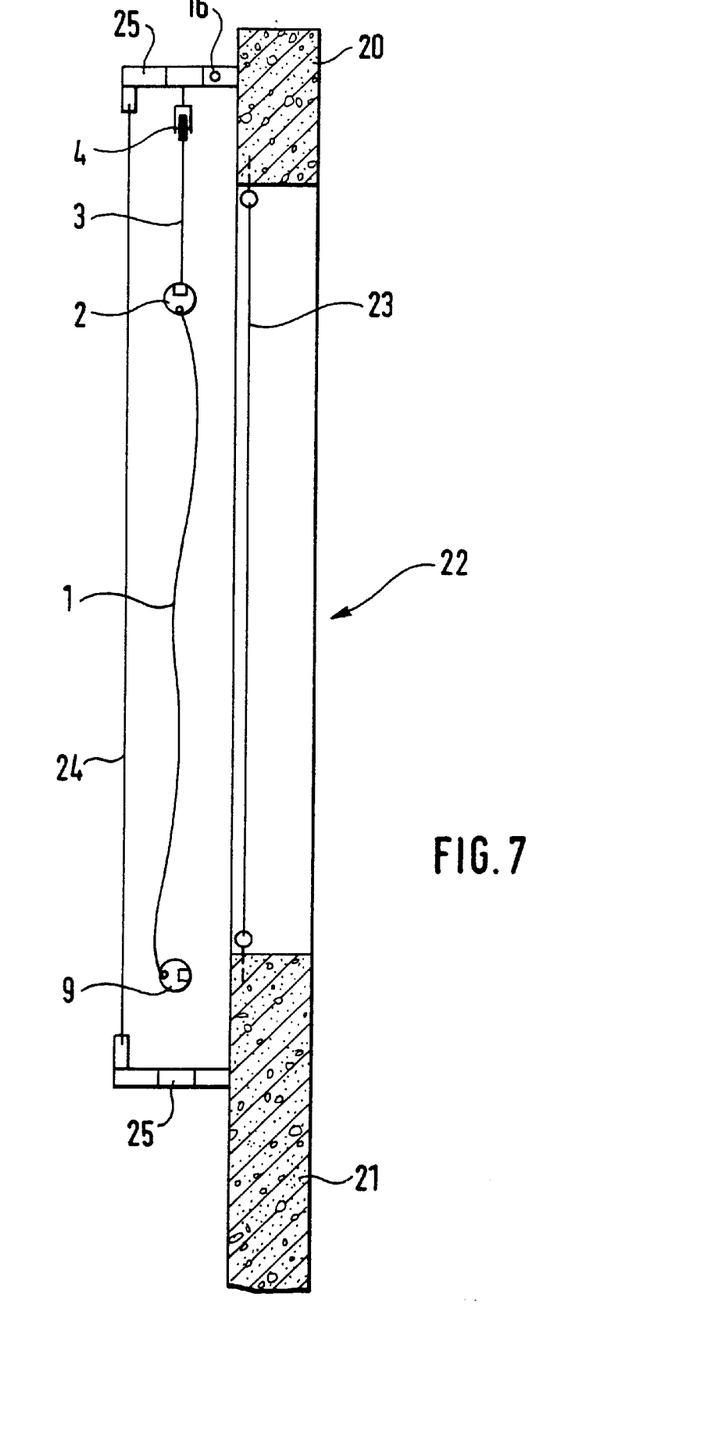
FIG. 7 shows a side view of an exemplary embodiment of a ventilation apparatus in a complete installation on an at least partly open shed wall.

FIG. 7 shows a ventilation apparatus according to the invention in the completely installed state in a side view roughly in accordance with FIGS. 2 and 6. In particular, the exemplary embodiment according to FIG. 1 could be comprehended by the representation of FIG. 7. The same components are again designated by the same reference numerals as in FIG. 1. It is essentially indicated that the tarpaulin-like wall element is suspended via a fall rope 3 and a horizontal bar 2 and acts on a winding shaft 9. The horizontal bar 2 is incidentally omitted in the representation of FIG. 5, since the net tarpaulin 17 extends over the entire width of the wall element 1, and thus the tarpaulins could also be connected, e.g. sewn, directly to one another over the entire width. However, the use of a corresponding horizontal bar 2 would also be perfectly feasible in FIG. 5. Such a horizontal bar 2 would make it easier to release the tarpaulins from one another.

Also indicated in FIG. 7 are a top transom 20 and a bottom wall 21 of a side of a shed building, the transom 20 and wall 21 defining between them an opening 22 to be closed by the tarpaulin-like wall element 1.

Also shown is the fact that the flapping clearance of the tarpaulin-like wall element 1 is limited toward the shed wall and away from the shed wall, specifically by boundary ropes or rods 23 and 24 respectively. The boundary rope 23 may be fastened to the transom 20 and the wall 21 respectively by means of eye bolts. The outer boundary rope 24 is fastened at a distance from these elements 20, 21 via holders 25, in which case the deflection pulley 4, for example, may also be suspended from the top holder 25.

Figure 8:
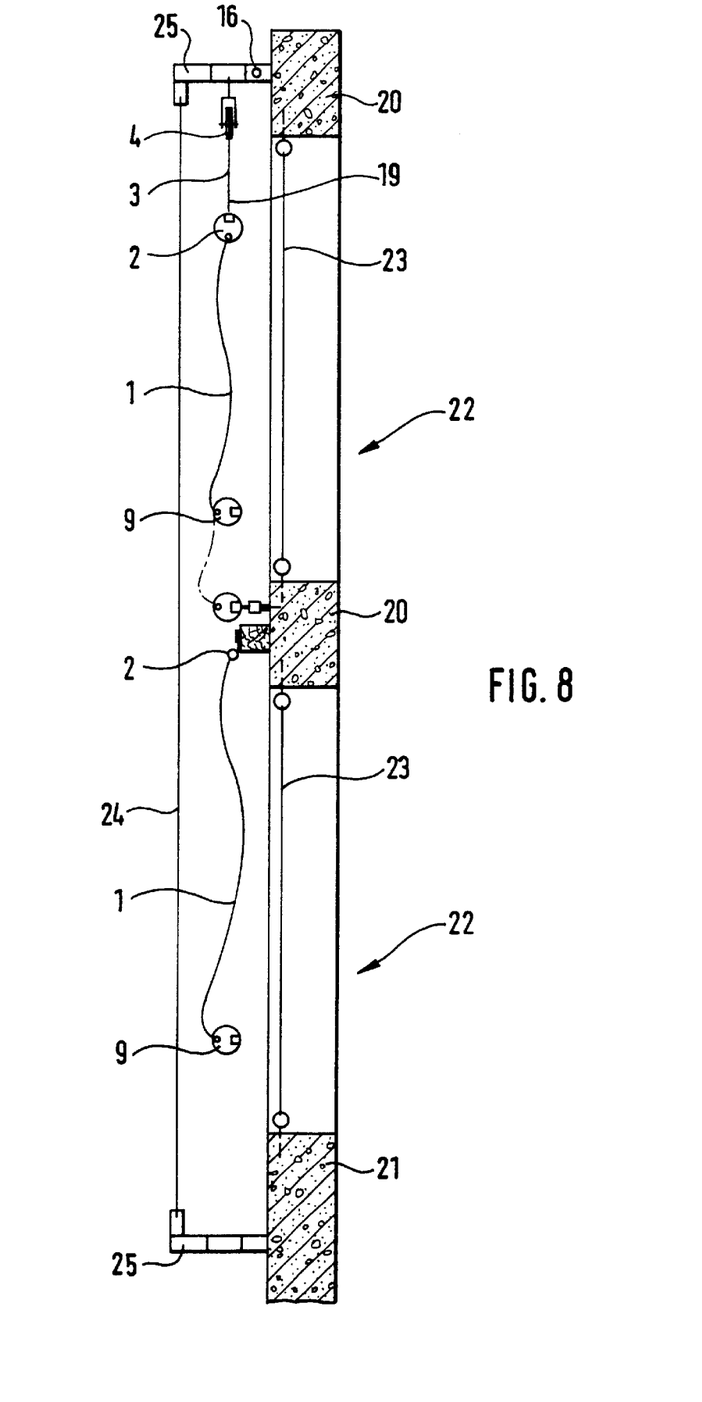
FIG. 8 shows a second exemplary embodiment of a complete installation of a ventilation apparatus, as an alternative to FIG. 7.

FIG. 8 shows a second exemplary embodiment of a complete installation according to FIG. 7. It is indicated in particular in this figure that two openings 22 may also be located in the shed wall, these openings 22 being defined by a bottom wall 21 and two transoms 20, so that two tarpaulin-like wall elements 1, which are to be opened or closed independently of one another and are arranged above one another, may be provided for closing these openings 22. As viewed over the length of a shed, a plurality of tarpaulin-like wall elements 1, operable in relation to one another or independently of one another, may of course also be arranged side by side, if need be coupled to one another via a main rope 5.

Figure 9:
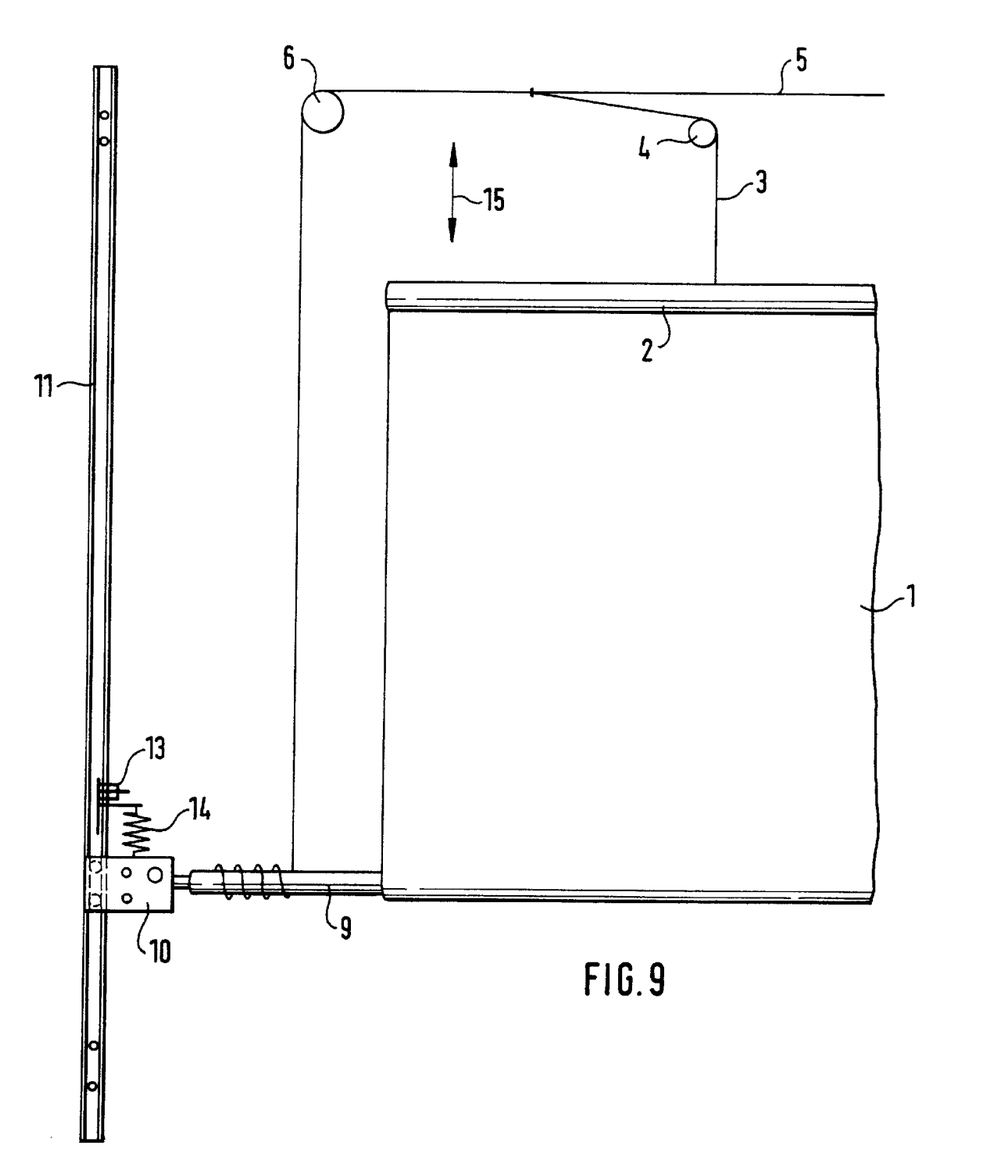
FIG. 9 shows, in accordance with FIG. 1, a front view of the ventilation apparatus with a simpler tension member.

FIG. 9 shows a front view of a ventilation apparatus according to FIG. 1. The ventilation apparatus differs from the exemplary embodiment of FIG. 1 only in that the main rope 5 is directly wound on the winding shaft 9, and thus the tension tarpaulin 7 is omitted. FIG. 9 therefore again shows an especially simple version of a ventilation apparatus according to the invention.

What is claimed is:

1. A ventilation apparatus for arranging in a wallsurface region of a building to be utilized essentially for agricultural purposes, which ventilation apparatus comprises at least one tarpaulin-like wall element (1), which, for ventilation through the wall surface, is to be opened more or less wide for passage of air, wherein the wall element (1) hangs on a tension member (3, 5, 7, 17), and is fixed with its bottom margin to a winding shaft (9) in such a way that it can be wound, the winding shaft (9) being drivable by means of a winding drive (10), and wherein the tension member (3, 5, 7, 17) can be actuated in synchronism by means of the same winding drive (10) for winding and unwinding the wall element (1) and for simultaneously lowering and lifting the top margin of the wall element (1).

2. The ventilation apparatus as claimed in claim 1, wherein the wall element (1) is suspended from a spreader-like horizontal bar (2).

3. The ventilation apparatus as claimed in claim 2, wherein the horizontal bar (2) can be moved up and down, and wherein the tension member (3, 7, 17) acts on it.

4. The ventilation apparatus as claimed in claim 1, wherein the tension member (7) is attached to the winding shaft (9) of the wall element (1) for independent winding in the opposite direction.

5. The ventilation apparatus as claimed in claim 4, comprising a bar-like winding core (16), in the region of which the tension member is divided into two strands (7a, b), which act on this winding core (16) for winding and unwinding.

6. The ventilation apparatus as claimed in claim 5, wherein the tension member (7) is arranged so as to be laterally offset from the wall element (1) in the longitudinal direction of the winding shaft (9).

7. The ventilation apparatus as claimed in claim 6, wherein the tension member (7), comprises a sheet or belt having a width.

8. The ventilation apparatus as claimed in claim 7, wherein the sheet is formed from the same tarpaulin material as the tarpaulin-like wall element (1).

9. The ventilation apparatus as claimed in claim 7, wherein the sheet (17) is formed as an air choke.

10. The ventilation apparatus as claimed in claim 9, wherein the sheet (17), if need be divided into vertical strips, extends in its width essentially over the entire width of the wall element (1).

11. The ventilation apparatus as claimed in claim 10, wherein the sheet (17) is directly connected to the top margin of the wall element (1).

12. The ventilation apparatus as claimed in claim 1, wherein the top margin of the wall element (1) can be fixed directly or indirectly in a top position, and wherein the winding shaft (9) can be lifted by its own winding work.

13. The ventilation apparatus as claimed in claim 12, wherein the winding drive (10) can be lifted together with the winding shaft (9).

14. The ventilation apparatus as claimed in claim 13, wherein the winding drive (10) is guided on a perpendicular guide rail (11).

15. A ventilation apparatus for arranging in a wall region of a shed building, as claimed in claim 1, wherein the winding shaft (9), is designed as a rail, which has approximately diametrically opposite slot guides for the positive-locking insertion of a widened marginal region of the tarpaulin-like wall element (1) and the tension member (3, 5, 7, 17) respectively.

16. The ventilation apparatus as claimed in claim 5, wherein a tension member strand (7a) more remote from the wall element (1) is arranged so as to be laterally offset from the wall element (1) in the longitudinal direction of the winding shaft (9).

17. The ventilation apparatus as claimed in claim 7, wherein the sheet (17) is formed as an air choke comprising a mesh in horizontal sections.

18. The ventilation apparatus for arranging in a wall region of a shed building, as claimed in claim 1, comprising one or more of a winding core (16), a horizontal bar (2) and or tubular element (8), said winding core, horizontal bar and tubular element designed as a rail, having approximately diametrically opposite slot guides for the positive-locking insertion of a widened marginal region of the tarpaulin-like wall element (1) and the tension member.

* * * * *